United States Patent [19]

Blais

[11] 4,334,060
[45] Jun. 8, 1982

[54] REACTOR FOR THE GAS PHASE NITRATION OF CELLULOSE

[75] Inventor: Marcel Blais, Newton, N.J.

[73] Assignee: The United States of America as represented by the Secretary of the Army, Washington, D.C.

[21] Appl. No.: 202,222

[22] Filed: Oct. 30, 1980

[51] Int. Cl.³ .............................................. C08B 5/02
[52] U.S. Cl. ...................... 536/35; 149/63; 422/198; 423/235; 536/38
[58] Field of Search .................. 536/35, 38; 149/63; 423/235

[56] References Cited

U.S. PATENT DOCUMENTS 230,216  7/1880  Arrault et al. ............... 536/35
1,780,151 11/1930 Becker et al. ............... 536/35

Primary Examiner—A. Lionel Clingman
Attorney, Agent, or Firm—Nathan Edelberg; Robert P. Gibson; A. Victor Erkkila

[57] ABSTRACT

A continuous process is provided for the vapor phase nitration of cellulose in a novel reactor having a gas tight housing containing a table with a perforated surface. Cellulose in porous sheet form is continuously passed into the reactor over the perforated table while continuously introducing nitric acid vapor into the housing through the perforations to provide a cushion of nitric acid gas supporting the sheet and forcing nitric acid vapor through the porous sheet. Water vapor formed in the reaction and unreacted nitric acid vapor are continuously removed from the housing, together with the nitrocellulose sheet produced. The rate at which the cellulose sheet is passed through the reactor depends on the rate at which the nitric acid is introduced and the degree of nitration desired. The cellulose can be partially nitrated by the novel process and further nitrated with nitric acid in liquid phase. The process produces a uniform nitrocellulose product suitable for use in propellants.

4 Claims, 5 Drawing Figures

REACTOR FOR THE GAS PHASE NITRATION OF CELLULOSE

GOVERNMENT RIGHTS

The invention described herein may be manufactured, used and licensed by the Government for Governmental purposes without the payment to me of any royalties thereon.

BACKGROUND OF THE INVENTION

Nitrocellulose, which is processed into various types of propellants, is manufactured from cellulose feed stocks consisting of fine fibers of cotton linters or macerated wood pulp.

The present method used to manufacture nitrocellulose involves the nitration of cellulose with a mixture of nitric acid, sulfuric acid and water. This process requires a purification operation that includes neutralization and stabilization steps which involve long boiling and washing operations, consuming large quantities of water, steam and electricity. Although the resulting product is satisfactory, the process is long and costly and large quantities of contaminated water are produced, causing pollution problems. The method of purification, however, does meet the pollution abatement requirements, but at a high cost.

Research has been conducted in an effort to improve the total process and the purification operation particularly so that they are more efficient and meet the pollution abatement requirements.

Among the difficulties in purifying the nitrocellulose produced by the nitric acid- sulfuric acid nitration of cellulose are the sulfate esters formed during the nitration and the presence of sulfuric acid trapped in the nitrocellulose fibers.

One method used in an attempt to overcome the problem is pressure digestion system. However, this method is unsatisfactory since the resulting product had a low viscosity and thus does not have the proper properties to enable it to be used in a large number of propellants.

Efforts have been made also to develop a process which eliminates the need for using sulfuric acid. It was found that nitric acid without sulfuric acid satisfactorily nitrated the cellulose, but the resulting nitrocellulose was not within the specifications required for use in propellants. However, it was found that if cellulose was nitrated with nitric acid alone in a vapor phase reaction, the problems of hornification and gelatinization are avoided and the nitrocellulose obtained is of acceptable quality. This product is also very easy to neutralize and stabilize when compared to the product obtained by the mixed acids method.

The advantages of the vapor or gas phase reaction because of the absence of sulfuric acid are:

(a) Easy recovery of nitric acid and significant reduction in the volume of nitrating acid required;

(b) Elimination of the expensive and complicated system for the separation, recovery and concentration of the mixed acids;

and (c) Simplification of the purification of nitrocellulose by shortening the boiling time and reducing energy, steam and water requirements.

In addition, the vapor or gas phase nitration process is advantageous in other ways, for example:

(a) The nitration step can be made continuous rather than batch;

(b) The purification step can be made continuous using pressure digestion. This is possible because of the much shorter boiling time that is required to obtain a stable material. Under these conditions, the viscosity reduction of the product below acceptable standards is minimal; and (c) The quantity of acid handled in the vapor or gas phase process is much less than in the mixed acid process with the result that the process and equipment required are significantly simplified.

The gas phase process for the nitration of cellulose, despite its advantages, has heretofore not been totally satisfactory since the nitrocellulose produced lacked homogeniety as manifested by erratic solubilities which affected propellant mixing. This was caused by a failure of the nitrating acid to reach all reaction sites of the cellulose fibers. The fact that the cellulose fibers can be properly nitrated by a gas phase reaction is demonstrated by a homogeneous product that can be made by a batch process vapor phase nitration of cellulose.

The above demonstrates that there is a need for a reactor which will permit a continuous gas or vapor phase reaction of nitric acid and cellulose to produce a nitrocellulose which is homogeneous and suitable for use in propellants.

BRIEF DESCRIPTION OF THE INVENTION

This invention relates to the production of nitrocellulose from cellulose by nitration in the gas or vapor phase with nitric acid and the reactor for carrying out the reaction. More particularly this invention relates to the nitration of cellulose in a continuous vapor phase reaction carried out in a reactor which is basically a large table enclosed in a rectangular box shaped housing. The table has perforations which allow the reaction gases to form a cushion of gas for the cellulose in sheet form to rest on as it passes through the reactor. The reactor has provision for heating or cooling the gas used in the reaction.

The reactor can also be used as a continuous dryer for cellulose or other materials if hot dry air is used instead of a reacting gas such as nitric acid.

DETAILED DESCRIPTION OF THE INVENTION

The present invention is based on the discovery that nitration of cellulose can be conducted in a continuous reaction in the gas phase using as the reactor a table reactor within a rectangular box shaped housing wherein the table reactor has therein a means for causing the cellulose in sheet form to move over a gas cushion as it runs through the reactor. The reactor also has means to heat or cool the gas which can be either a reaction gas or a drying gas. In addition there is a perforated surface which provides means for the gas to contact the sheet of cellulose as well as provide a cushion of gas for the cellulose sheet to move on as it passes through the reactor.

The degree of nitration of the cellulose and homogeneity of the nitrocellulose produced depend on a number of interrelated variables, notably, concentration and rate of flow of the nitric acid gas, reaction temperatures, thickness, porosity and rate of feed of the cellulose sheet, and size and density of perforations. These variables can be adjusted in a suitable manner to achieve the desired degree of nitration and homogeniety of the nitrocellulose product.

The reactor can be used for any continuous gas phase reaction or as a continuous dryer for materials which can be made into porous sheets and moved through the reactor.

The reactor can be made of any suitable material which is inert to the reaction being conducted. Thus, if the reactor is intended to be used for a nitration reaction, it can be made of aluminum or stainless steel.

Figure 1:
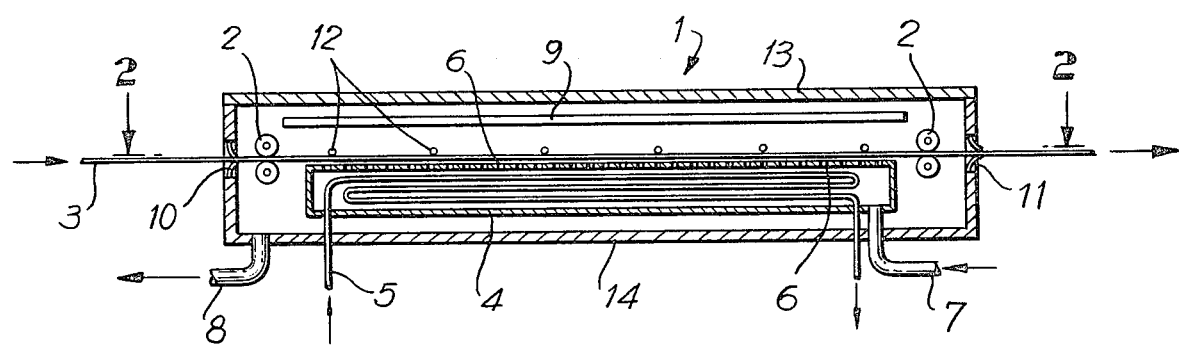
FIG. 1 is a side elevational view in section of the reactor of this invention.
Figure 2:
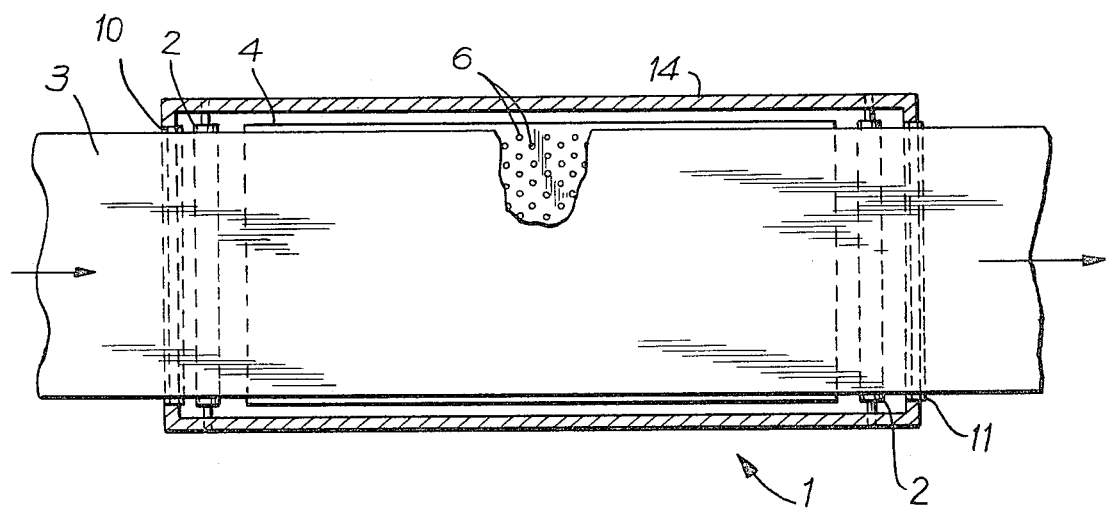
FIG. 2 is a top view of the reactor taken along line 2—2 of FIG. 1.

Referring now to the drawings, the reactor 1 depicted in FIGS. 1 and 2, is a generally rectangular box-shaped housing 14 having a removable cover 13.

Inside the housing 14 is disposed an air table 4 extending somewhat less than the length and width of the housing 14 and having therein a heater/cooler 5 which heats or cools the gases used for reaction or drying. The top of the air table 4 contains perforations 6 for the gases to escape and form a cushion for the sheet 3 being reacted or dried.

The gases enter the air table 4 through a duct 7 in the bottom thereof. The water of reaction and unreacted gases escape through the duct 8 which is in the bottom of the housing 14 remote from the gas intake duct 7.

The ends of the housing 14 have gas seals 10 and 11 through which the sheet of cellulose linter or pulp or any other material which is to be dried or treated with gas, enters and leaves. The gas seal 10 at the left is the inlet and the gas seal 11 at the right is the outlet. The sheet 3 is passed over the air table 4 and is held up by the gas cushion so it floats. Two guide rollers 2 are installed at each end of the reactor 1 to keep the sheet 3 in motion and under constant tension. The rate at which the sheet 3 moves depends on the time required to insure proper nitration.

A series of small rollers 12 are placed in the reactor housing 14 so they can hold the sheet 3 down onto the gas cushion as it passes through the reactor 1.

Liquid acid collectors 9 can be installed near the top of the reactor housing 14 to prevent the liquid acid from falling back onto the sheet 3 being nitrated.

The nitration reaction which is typical of those which are suitable for the reactor 1 of this invention will be described to illustrate the invention.

Referring to FIGS. 1 and 2, a sheet 3 of cellulose linter or pulp enters the reactor 1 at a gas seal 10 in the housing 14, is guided between guide rollers 2 and underneath the hold down rollers 12 where it is moved by the guide rollers 2 over the air table 4 at a rate that will insure the desired nitration. The sheet 3, which is porous so the gas can reach all its active sites, is held up by a cushion of nitric acid gas which enters through the perforations 6 in the top of the table 4. The gas enters the air table 4 through the inlet 7 from a pressurized gas source, not shown, passes over the heater, if needed, and out the perforations 6. The gas is forced through the cellulose sheet 3 at a suitable rate and the nitration takes place. The degree of nitration sought will depend on whether a vapor phase nitration alone or a multi-phase nitration is carried out. This will also determine the retention time of the sheet 3 in the reactor 1. If vapor phase nitration is used only, then about 12% to 14% by weight of nitrogen is added to the cellulose. If a multi-phase reaction is used then about 7% by weight of nitrogen is added to the cellulose in the vapor phase reaction. This 7% nitrogen product is insoluble in concentrated nitric acid which is used in the succeeding liquid reaction phase, thus, hornification and gelatinization does not take place in the liquid phase reaction.

The multi-phase reaction is preferred because the resulting product of nitrocellulose possesses all the properties which enable it to be acceptable for all types of propellants.

The water of reaction and unreacted gases escape through the outlet 8 at the bottom of the reactor housing 14. These materials are collected and dried. The dry nitric acid vapor is recycled into the reaction through the inlet 7.

The speed with which the sheet 3 moves through the reactor 1 depends on the gas rate and the degree of nitration desired as explained above.

Figure 3:
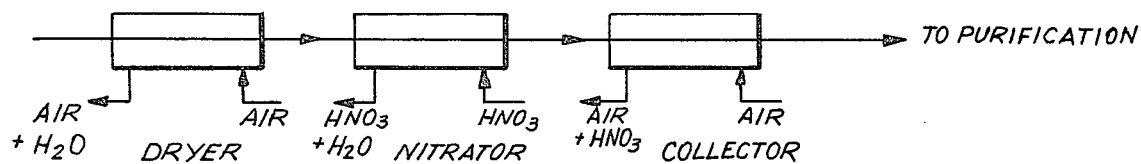
FIG. 3 is a schematic flowsheet of a vapor phase nitration reaction and apparatus of this invention.
Figure 4:
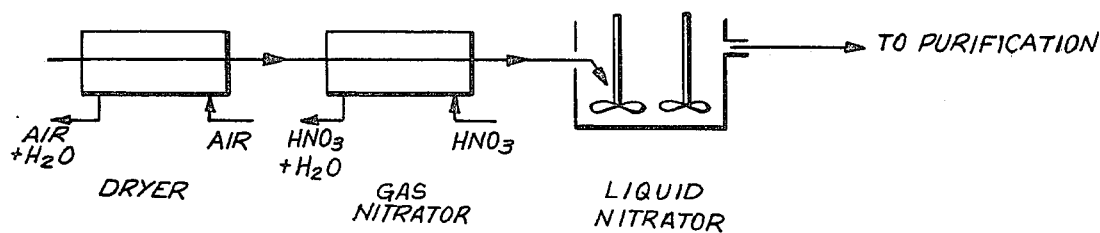
FIG. 4 is a schematic flowsheet of a multiphase nitration process consisting of a vapor phase nitration followed by a liquid phase nitration.

The nitrated material coming out of the nitrator as shown in FIG. 3 is about 12% to 14% nitrogen. If a multi-phase reaction as depicted in FIG. 4 is used, the material coming out of the first vapor phase nitrator has about 7% nitrogen. This material is then further nitrated in a liquid nitric acid bath as shown in FIG. 4. The nitrogen content is regulated to be between about 12% to 14%.

Figure 5:
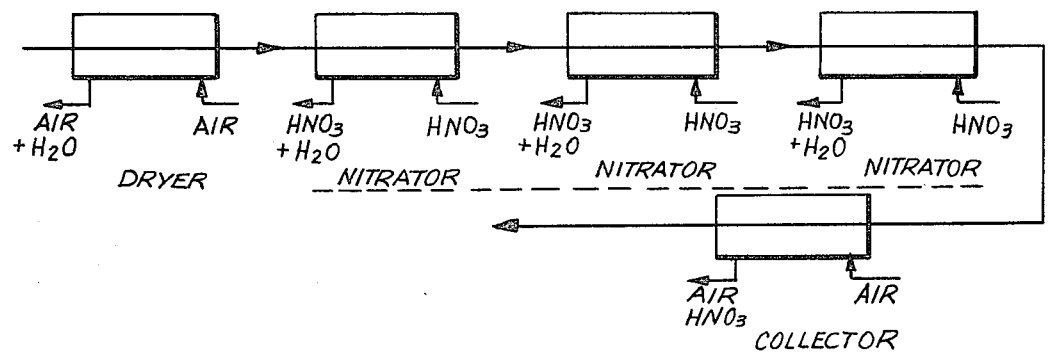
FIG. 5 is a schematic flowsheet of a vapor phase nitration using a series of reactors linked in series.

If a single gas phase nitration process is used, a longer nitrator is built or, as shown in FIG. 5, a second or third or if desired more smaller nitrator reactors are added to the first in series. Traces of nitric acid are removed from the nitrocellulose sheets by the use of a dry gas or air in the collectors as shown in FIGS. 3 and 5. The dryers shown in FIGS. 3, 4 and 5 are used to dry the cellulose to remove water to the extent possible so that it will not interfere with the vapor phase reaction and cause unsatisfactory products to result. Once the nitrocellulose product is collected and dried, it is purified in conventional purifiers, not shown, and recovered.

The multi-phase nitration process depicted in FIG. 4 is the preferred method because the low nitrogen level of the nitrocellulose from the vapor phase nitration presents less safety hazards and the final nitrogen content is more easily controlled by nitration in the liquid phase.

This invention has been described with respect to certain preferred embodiments and modifications. Variations in the light thereof will be suggested to persons skilled in the art and are to be included within the spirit and purview of this application and the scope of the appended claims.

I claim:

1. A continuous vapor phase process for the nitration of cellulose to produce nitrocellulose by reaction with nitric acid which comprises
    introducing cellulose in porous sheet form into a reactor having a substantially gas-tight housing containing a table having a perforated surface,
    passing the cellulose sheet over at least a portion of the perforated surface of said table,
    introducing a stream of nitric acid vapor into said housing and through said perforations to provide a cushion of gas supporting said sheet moving over said table and force nitric acid vapor through said porous cellulose sheet, contacting said sheet with said nitric acid vapor for a sufficient period to nitrate the cellulose to a nitrogen content of at least about 7%, and continuously removing from said housing unreacted nitric acid vapor and water vapor formed in the reaction and the nitrocellulose sheet thus produced.

2. The process according to claim 1, wherein the reaction is carried out in a series of said reactors.

3. The process according to claim 1 or 2, wherein the cellulose is nitrated to a nitrogen content of about 7% and then further nitrated with nitric acid in liquid phase to a nitrogen content of about 12% to 14%.

4. The process according to claim 1 or 2, wherein the cellulose is nitrated to a nitrogen content of about 12% to 14%.

* * * * *